US006835234B2

United States Patent
Leffel et al.

(10) Patent No.: US 6,835,234 B2
(45) Date of Patent: Dec. 28, 2004

(54) INTAKE TUBE ASSEMBLY WITH EVAPORATIVE EMISSION CONTROL DEVICE

(75) Inventors: Jeffry Marvin Leffel, West Bloomfield, MI (US); David S. Moyer, Sterling Heights, MI (US); Gregory Scott Green, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/318,508

(22) Filed: Dec. 12, 2002

(65) Prior Publication Data

US 2004/0112219 A1 Jun. 17, 2004

(51) Int. Cl.[7] .............................................. B01D 53/04
(52) U.S. Cl. ............................ 96/108; 96/138; 96/147; 96/151; 96/154; 55/385.3; 55/503; 55/514; 55/524
(58) Field of Search ................................ 96/108, 134.1, 96/35, 137.13, 8, 147, 151, 153, 154; 55/385.3, 495, 503, 504, 514, 522, 524, 525; 123/184.61

(56) References Cited

U.S. PATENT DOCUMENTS

| | | | | |
|---|---|---|---|---|
| 1,950,502 A | * | 3/1934 | Madan | 96/119 |
| 2,577,606 A | * | 12/1951 | Conley | 96/134 |
| 3,263,704 A | * | 8/1966 | Boisjoly | 138/42 |
| 4,157,902 A | * | 6/1979 | Tokar | 55/385.3 |
| 4,903,644 A | | 2/1990 | Groger et al. | |
| 5,062,874 A | * | 11/1991 | Legare et al. | 55/337 |
| 5,110,330 A | * | 5/1992 | Loughran | 96/117.5 |
| 5,535,717 A | | 7/1996 | Rygiel | |
| 5,586,996 A | | 12/1996 | Manookian, Jr. | |
| 5,769,045 A | | 6/1998 | Edwards et al. | |
| 6,136,075 A | * | 10/2000 | Bragg et al. | 96/135 |
| 6,152,996 A | | 11/2000 | Linnersten et al. | |
| 6,277,178 B1 | * | 8/2001 | Holmquist-Brown et al. | 96/135 |
| 6,350,291 B1 | | 2/2002 | Gieseke et al. | |
| 6,395,072 B2 | | 5/2002 | Miura et al. | |
| 6,432,179 B1 | | 8/2002 | Lobovsky et al. | |
| 6,440,200 B1 | | 8/2002 | Sakakibara et al. | |
| 6,537,355 B2 | * | 3/2003 | Scardino et al. | 96/147 |
| 2002/0078829 A1 | | 6/2002 | Scardino et al. | |
| 2002/0124733 A1 | * | 9/2002 | Iriyama et al. | 96/134 |
| 2003/0019361 A1 | * | 1/2003 | Wolff et al. | 96/134 |
| 2003/0066427 A1 | * | 4/2003 | Ishida | 96/135 |
| 2003/0145732 A1 | * | 8/2003 | Leffel et al. | 96/134 |
| 2004/0011197 A1 | * | 1/2004 | Wernholm et al. | 95/90 |

OTHER PUBLICATIONS

UK Search Report dated Mar. 29, 2004.

* cited by examiner

*Primary Examiner*—Robert H. Spitzer
(74) *Attorney, Agent, or Firm*—Brinks Hofer Gilson & Lione

(57) ABSTRACT

An air induction system of an automotive internal combustion engine comprises an evaporative emission control device inserted into an air intake tube connecting an air cleaner canister and an intake manifold of the engine. The evaporative emission control device comprises a rigid tubular body that includes an upstream end and a downstream end. A hydrocarbon vapor absorbing element is disposed within the rigid tubular body such that the upstream face is recessed from the upstream end of the rigid tubular body, and the downstream face is recessed from the downstream end of the rigid tubular body. The extended ends of the rigid tubular body thereby protect the recessed faces from incidental contact. The air intake tube is formed of elastomeric material that provides flexible support for the evaporative emission control device to protect against damage due to vibration.

12 Claims, 1 Drawing Sheet

INTAKE TUBE ASSEMBLY WITH EVAPORATIVE EMISSION CONTROL DEVICE

TECHNICAL FIELD OF THE INVENTION

This invention relates to an air intake tube assembly for an internal combustion engine that includes an evaporative emission control device. More particularly, this invention relates to an air intake assembly wherein the evaporative emission control device comprises hydrocarbon vapor absorbing material protected by a rigid tubular body and inserted into the flow path through an elastomeric air tube.

BACKGROUND OF THE INVENTION

In an automotive vehicle, a common system for supplying air to an internal combustion engine comprises an air intake tube, referred to as a zip tube, connected between an air cleaner canister and an air intake manifold of the internal combustion engine. There is concern over hydrocarbon vapors that may diffuse from the intake manifold through the tube when the engine is not running and may be emitted into the atmosphere. It has been proposed to include a material that absorbs hydrocarbon vapor in communication with the air flow path to absorb vapors diffusing from the intake manifold. The material is formed as a structure, such as a monolith, having gas passages to allow contact with the vapor-containing air. The material may be installed in a separate canister in the air induction system. However, this requires additional connections to the air induction system that add to the cost and the difficulty of assembling the air induction systems into the vehicle. Moreover, suitable vapor-absorbing materials, such as carbon or zeolite, are fragile and susceptible to damage due to incidental impact during handling and installation. Also, vibration during engine operation or vehicle travel over non-smooth road surfaces may result in damage during use. Such damage may dislodge particles that may restrict air flow to the engine or may be drawn into the intake manifold and potentially adversely affect engine operation.

Therefore, there is a need for an air intake tube for an internal combustion engine which includes an evaporative emission control device to absorb hydrocarbon vapors attempting to escape from the engine and may be readily installed with minimal connections, and further which protects the fragile hydrocarbon absorbing element from damage during installation and use.

BRIEF SUMMARY OF THE INVENTION

In accordance with this invention, an air induction system of an automotive internal combustion engine comprises an evaporative emission control device inserted into an air intake tube that is connected to an air cleaner canister and an air intake manifold of the engine. The evaporative emission control device comprises a rigid tubular body that includes an upstream end and a downstream end. A hydrocarbon vapor absorbing element is disposed within the rigid tubular body. The hydrocarbon absorbing element comprises an upstream face that is recessed from the upstream end of the rigid tubular body and a downstream face that is recessed from the downstream end of the rigid tubular body. By recessing the faces of the hydrocarbon vapor absorbing element from the ends of the rigid tubular body, the rigid tubular body extends to protect the hydrocarbon absorbing element from incidental contact during installation and use. In addition, by forming the air intake tube of elastomeric material and inserting the evaporative emission control device therein, the air intake tube provides flexible support for the evaporative emission control device to protect against damage due to engine vibration or bumpy vehicle travel.

BRIEF DESCRIPTION OF THE DRAWINGS

The present invention will be further illustrated with reference to the accompanying drawings wherein.

DETAILED DESCRIPTION OF THE INVENTION

Figure 1:
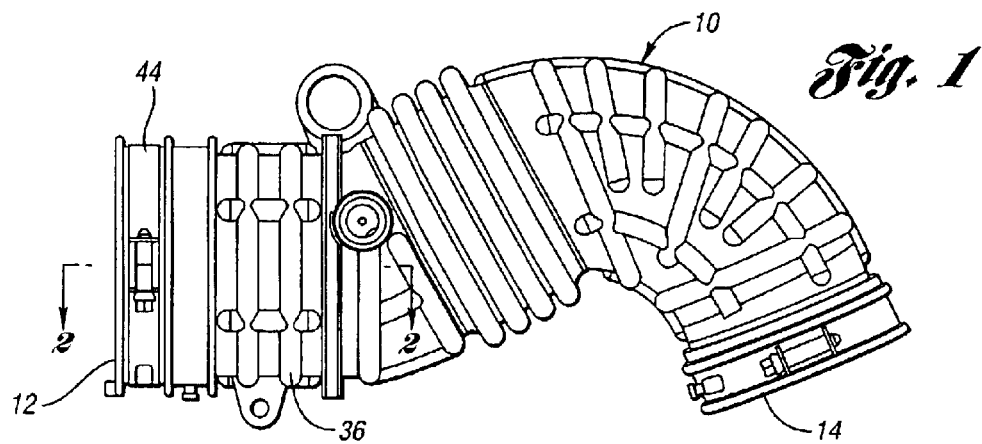
FIG. 1 is a plan view of an air intake tube in accordance with a preferred embodiment of the invention.
Figure 2:
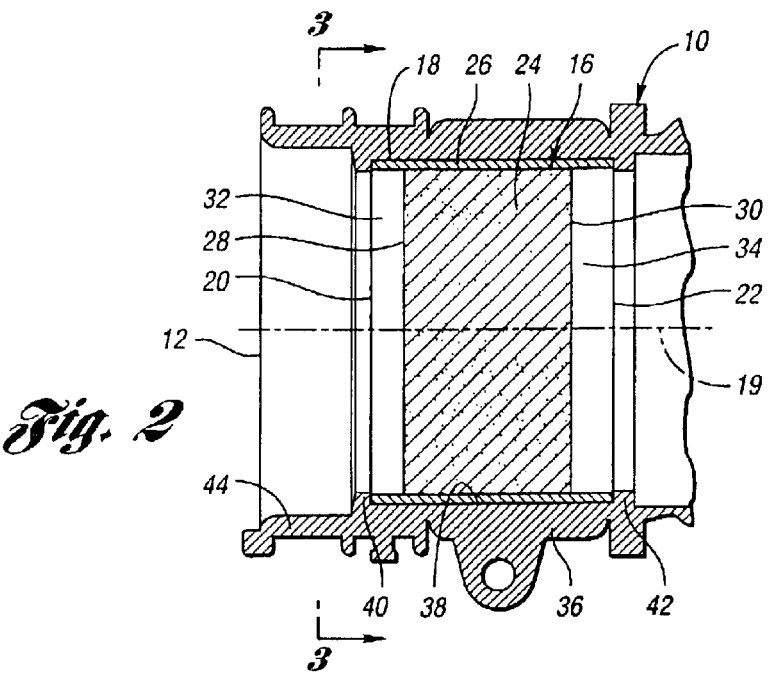
FIG. 2 is a cross-sectional view of an intake end portion of the air intake tube in FIG. 1, taken along line 2—2, showing the evaporative emission control device.
Figure 3:
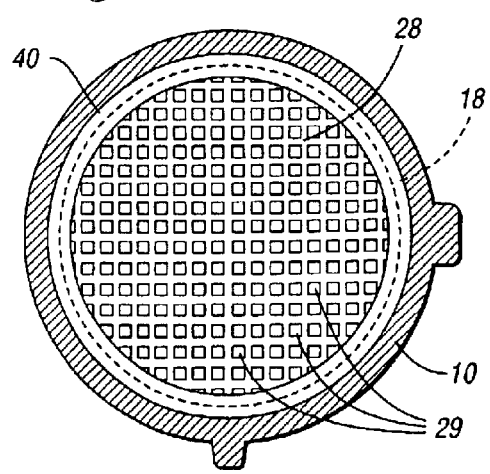
FIG. 3 is a cross-sectional view of the air intake assembly in FIG. 1 and FIG. 2, taken along the lines 3—3 in FIG. 2.

In accordance with a preferred embodiment of this invention, referring to the Figures, an air induction system of an automotive internal combustion engine comprises an air intake tube 10 of the type referred to as a zip tube. At one end, tube 10 comprises an inlet 12 that is adapted to be connected to an outlet of an air cleaner canister. At the opposite end, tube 10 comprises an outlet 14 that is adapted to be connected to an intake manifold of the engine. During operation, air flows from inlet 12, which is upstream, to outlet 14, which is downstream, to supply air to the engine.

In accordance with this invention, air intake assembly includes an evaporative emission control device 16 that is inserted into air intake tube 10. Control device 16 comprises a rigid tube 18 cylindrical about an axis 19 and including an upstream end 20 proximate to inlet 12 and a downstream end 22 remote from inlet 12 relative to upstream end 20. Tube 18 is formed of metal or polymer that resists flexure and thereby provides reinforcement for the surrounding elastomeric material of tube 10. A hydrocarbon vapor absorbing element 24 is disposed within a midsection 26 of tube 18. A preferred hydrocarbon vapor absorbing element is a monolith structure formed of stainless steel and having zeolite coating that absorbs hydrocarbon vapors. Alternately, element 24 may be a monolith composed of porous carbon or other suitable hydrocarbon absorbing material. Element 24 includes an upstream face 28, a downstream face 30 and a plurality of axial gas passages 29 therebetween. Tube 18 includes an end section 32 that extends from midsection 26 adjacent upstream face 28 of vapor absorbing element 24, so that the upstream face 28 is recessed from the upstream end 20 of tube 18. Similarly, tube 18 includes an end section 34 that extends from midsection 26 adjacent downstream face 30 so that the downstream face is recessed from downstream end 22 of the tube. By recessing faces 28 and 30, end sections 32 and 34 protect the faces from incidental contact that might otherwise damage the vapor absorbing element.

In this invention, emission control device 16 is inserted into air intake tube 10 such that emission control device 16 is received in a section 36 of tube 10 spaced apart from inlet 12 and outlet 14. Section 36 includes an inner wall 38 that is coaxial about axis 19. Wall 38 sealingly engages the outer surface of tube 18 to form a circumferential hermetic seal to prevent vapor bypass about emission control device 16. A preferred seal is formed by molding tube 10 of an elastomeric material such that the diameter of wall 38 is less than the diameter of tube 18 and thereafter inserting device 16 into section 36 while expanding the diameter of wall 38 to conform to the outer surface of rigid tube 18, as described herein. Section 36 also includes an upstream stop 40 that inwardly protrudes from wall 38 circumferentally about the tube adjacent upstream end 20 to prevent upstream displacement of device 16. Similarly, section 36 includes a downstream stop 42 that extends inwardly from wall 38 and circumferentially about section 36 adjacent downstream end 22 to prevent downstream displacement of emission control device 16. In this manner, emission control device 16 is secured in section 36 between stops 40 and 42.

In this embodiment, section 36 is located near inlet 12 of air intake tube 10, as opposed to outlet 14, to reduce the temperature of element 24 during engine operation, and thereby enhance the vapor absorption properties when the engine is turned off. It is a feature of this invention that the upstream face 28 of hydrocarbon absorbing element 24 is spaced apart from inlet 12 to prevent damage. Spacing is provided, in part, by extension 32 of tube 18, and also by a section 44 of air tube 10 between inlet 12 and upstream stop 40. It is desired that the distance between inlet 12 and face 28 is at least equal to one third the diameter of inlet 12, and preferably greater than the radius, to minimize accidental contact during installation of tube 10 onto the air cleaner canister. In addition, section 44, as well as the extended downstream section of the tube, provides flexible support for hydrocarbon absorbing element 24 to reduce damage due to vibration during vehicle operation, as well as incidental contact that may occur during engine maintenance and repair.

It is an advantage of this invention that the evaporative emission control device 16 may be readily assembled into air intake tube 10. Vapor absorbing element 24 is suitably secured in midsection 26 of tube 18. Tube 10 is molded of elastomeric material such that wall 38 has a diameter perpendicular to axis 19 less than the outer diameter of tube reinforcement 18, and also such that the inner diameter of section 44 between inlet 12 and upstream stop 40 is greater than the outer diameter of tube 18 to provide clearance during insertion. Device 16 is axially inserted through inlet 12, with downstream end 22 first, and readily slides past the larger section 44 bringing downstream end 22 to engage upstream stop 40. Force is applied to device 16 to expand the elastomeric material and enlarge the diameter of stop 40 and section 36 to accommodate the outer diameter of tube 18. The force is continued to advance tube 18 past stop 40 until upstream end 20 clears upstream stop 40 and downstream end 22 encounters downstream stop 42. Water or other lubricant may be applied to facilitate movement of tube 18 past stop 40 and over wall 38. As tube passes upstream stop 40, the elastomeric material contracts to return stop 40 to a diameter less than tube 18. Positioned between stops 40 and 42, wall 38 remains distended to engage the outer surface of tube 18 to form the desired hermetic seal. It is an advantage of the preferred design that tube 26 is rigid and extends beyond face 30 to protect the vapor absorbing material during insertion. While this embodiment has been described for a vapor control device 16 that is inserted through the inlet of the air intake tube and positioned in the section near the inlet, the air intake tube may be suitably designed with a section adjacent the outlet for receiving the emission control device, whereupon the vapor control device 16 may be suitably inserted through the outlet of the air intake tube.

During engine operation, air flows through air intake tube 10 from the air cleaner canister to the intake manifold of the engine, including through the gas passages of vapor absorbing element 24. When the engine is turned off, hydrocarbon vapors in the intake manifold may diffuse into air intake tube 10 through outlet 14. Vapors diffusing through the tube are absorbed by the vapor absorbing element 24 and prevented from diffusing to inlet 12 and through the air cleaner unit into the atmosphere. Thereafter, when the engine is operated again, absorbed hydrocarbon is drawn into the air stream passing through vapor absorbing element 24 and is carried to the intake manifold for combustion within the engine. Thus, vapor absorbing element 24 provides an effective barrier to prevent hydrocarbon emission through air intake tube 10 into the atmosphere.

Therefore, this invention provides an air intake assembly that includes a hydrocarbon vapor absorbing element strategically located within an air intake tube of the air induction system of an automotive vehicle. The hydrocarbon absorbing element is supported apart from the air cleaner unit and the engine by flexible sections of the air intake tube. This flexible support reduces vibration of the vapor absorbing element during vehicle operation that might otherwise damage the vapor absorbing element and dislodge pieces that might block gas passages through the vapor absorbing element, thereby increasing the resistance to air flow through the air induction system, or even be carried by the air stream to the intake manifold and adversely affect engine operations. The recessed faces of the hydrocarbon absorbing element are protected by the end sections of the rigid tubular body against damage during insertion of the emission control device into the air intake tube or installation of the air intake tube into the vehicle. Stops are provided to secure the emission control device within the desired section of trio air intake tube without requiring external clamps or other devices.

While this invention has been described in terms of certain embodiments thereof, it is not intended to be limited to the described embodiments, but only to the extent set forth in the claims that follow.

What is claimed is:

1. An air intake tube assembly for an automotive internal combustion engine and comprising:
    an evaporative emission control device comprising a rigid tubular body and a hydrocarbon vapor absorbing element disposed within the rigid tubular body, said rigid tubular body having an axis and comprising an upstream end and a downstream end, said hydrocarbon vapor absorbing element comprising an upstream face facing said upstream end and recessed therefrom, a downstream face facing the downstream end and recessed therefrom, and a plurality of axial gas passages therebetween, and
    an air tube formed of an elastomeric material and having a tube end and a tube section spaced apart from the tube end, said tube section comprising an inner wall, said evaporative emission control device being received in said tube section such that the inner wall conforms about the rigid tubular body and forms a circumferential hermetic seal therebetween.

2. An air intake assembly for an automotive internal combustion engine according to claim 1 wherein the rigid tubular body is formed of metal.

3. An air intake assembly for an automotive internal combustion engine according to claim 1 wherein the rigid tubular body is formed of a polymeric material.

4. An air intake assembly for an automotive internal combustion engine according to claim 1 wherein the hydrocarbon vapor absorbing element is formed of a metal structure comprising a zeolite coating.

5. An air intake assembly for an automotive internal combustion engine according to claim 1 wherein the hydrocarbon vapor absorbing element is formed of a porous carbon material.

6. An air Intake assembly for an automotive internal combustion engine according to claim 1 wherein the air tube comprises an inwardly protruding stop that engages the upstream end of said rigid tubular body to prevent upstream displacement of the evaporative emission control device.

7. An air intake assembly for an automotive internal combustion engine according to claim 1 wherein the air tube comprises an inwardly protruding stop that engages the downstream end of sad rigid tubular body to prevent downstream displacement of the evaporative emission control device.

8. An air intake assembly for an automotive internal combustion engine according to claim 1 wherein the rigid tubular body is cylindrical.

9. An air intake assembly for an automotive internal combustion engine according to claim 1 wherein the tube end is generally circular and has a diameter, and wherein the distance between the tube end and the upstream face of the hydrocarbon vapor absorbing element is at least equal to one-third of the diameter.

10. An air intake assembly for an automotive internal combustion engine according to claim 1 wherein the tube end is adapted for connection to an outlet of an air cleaner canister.

11. An air intake tube assembly for an automotive internal combustion engine and comprising:

an evaporative emission control device comprising a rigid tubular body and a hydrocarbon vapor absorbing element disposed within the rigid tubular body, said rigid tubular body comprising an outer surface cylindrical about an axis, an upstream end and a downstream end axially spaced from said upstream end, said hydrocarbon vapor absorbing element comprising an upstream face facing said upstream end and recessed therefrom, a downstream face facing the downstream end and recessed therefrom, and a plurality of axial gas passages therebetween, and an air tube formed of an elastomeric material and having a tube end adapted for connection to an air filter canister and a tube section spaced apart from the tube end, said tube section comprising a cylindrical inner wall sealingly engaging the outer surface of the rigid tubular body, an upstream stop extending circumferentially within the air tube adjacent the upstream end of the rigid tubular body to prevent upstream displacement thereof, and a downstream stop extending circumferentially within the air tube adjacent the downstream end of the rigid tubular body to prevent downstream displacement thereof.

12. An air intake assembly according to claim 11 wherein the tube section has an as-molded diameter in the absence of said evaporative emission control device and an expanded diameter greater than said as-molded diameter about said evaporative emission control device received in the tube section.

\* \* \* \* \*

UNITED STATES PATENT AND TRADEMARK OFFICE
CERTIFICATE OF CORRECTION

PATENT NO. : 6,835,234 B2
DATED : December 28, 2004
INVENTOR(S) : Jeffry M. Leffel et al.

It is certified that error appears in the above-identified patent and that said Letters Patent is hereby corrected as shown below:

Column 5,
Line 3, after "air" delete "Intake" and substitute -- intake -- in its place.
Line 11, before "rigid" delete "sad" and substitute -- said -- in its place.

Signed and Sealed this

Seventh Day of June, 2005

JON W. DUDAS
*Director of the United States Patent and Trademark Office*